United States Patent [19]

Jordan

[11] 4,031,653

[45] June 28, 1977

[54] BAITING ARRANGEMENT FOR RODENTS

[76] Inventor: Carmel T. Jordan, 1040 Grandview Ave., Union, N.J. 07083

[22] Filed: Apr. 12, 1976

[21] Appl. No.: 676,361

Related U.S. Application Data

[63] Continuation-in-part of Ser. No. 466,149, May 2, 1974, Pat. No. 3,965,609.

[52] U.S. Cl. ..................................... 43/61; 43/76; 43/131
[51] Int. Cl.² ........................................ A01M 23/20
[58] Field of Search ................... 43/131, 61, 66, 76, 43/64, 65, 67

[56] References Cited
UNITED STATES PATENTS

| | | | |
|---|---|---|---|
| 801,537 | 10/1905 | Massie | 43/76 |
| 909,797 | 1/1909 | Hicks | 43/61 |
| 1,066,004 | 7/1913 | Ellison | 43/76 |
| 1,171,657 | 2/1916 | Robertson | 43/76 |
| 2,650,451 | 9/1953 | Karstedt | 43/131 |

Primary Examiner—Warner H. Camp
Attorney, Agent, or Firm—Joseph F. Padlon

[57] ABSTRACT

A rodent baiting arrangement in which modular plastic units are assembled to form an entrance and feeding station into which rodents may pass, consume poisonous bait therein, and exit. The modular units may be assembled for placement along a wall or corner of an interior room or space, while being inaccessible to children and domestic animals. The assembled modules form a housing for the rodents, with feed and water therein. The modules may have transparent top surfaces to allow inspection of the interior of the modules.

10 Claims, 5 Drawing Figures

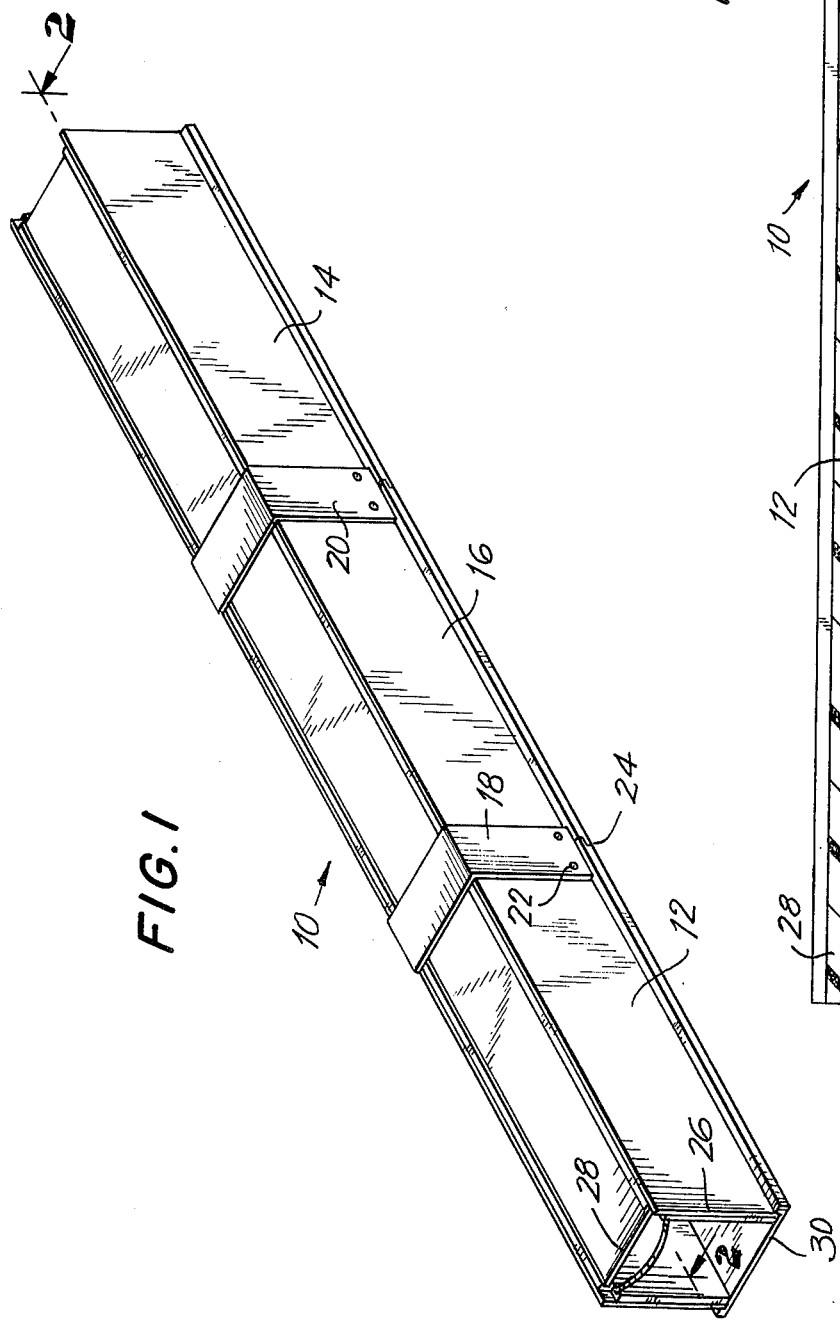
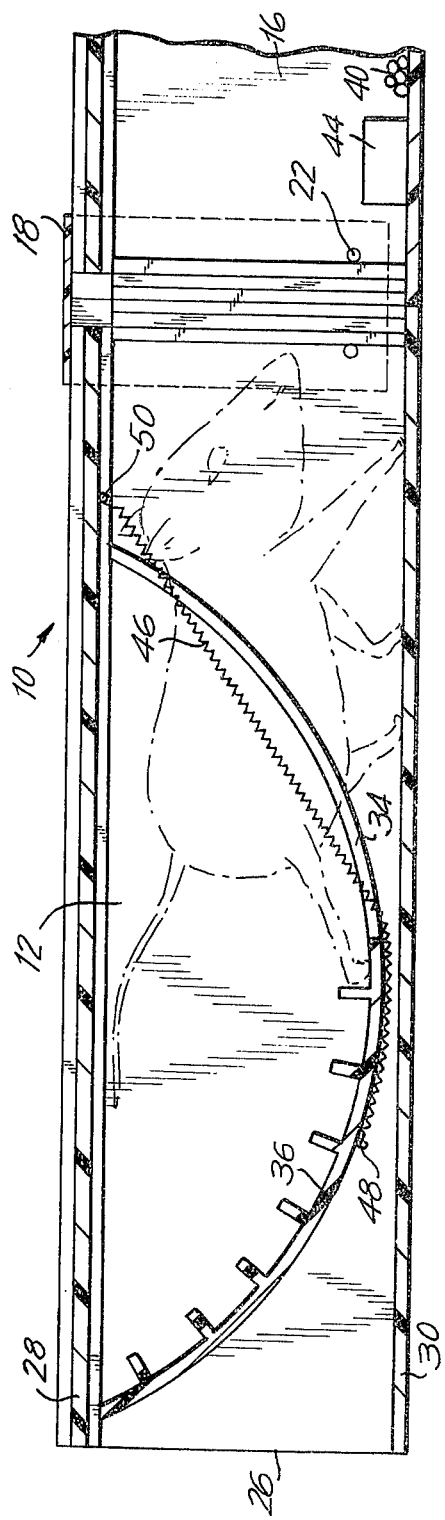

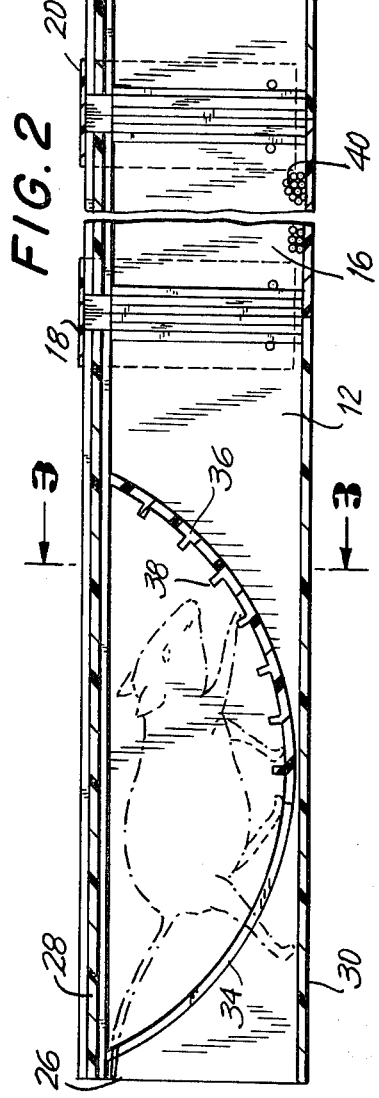
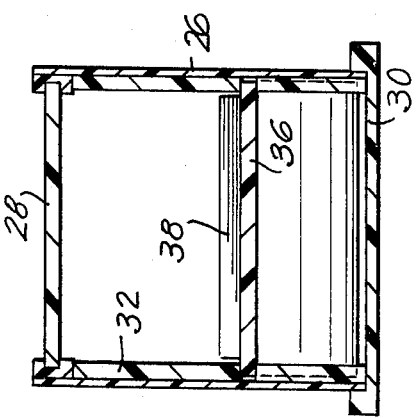
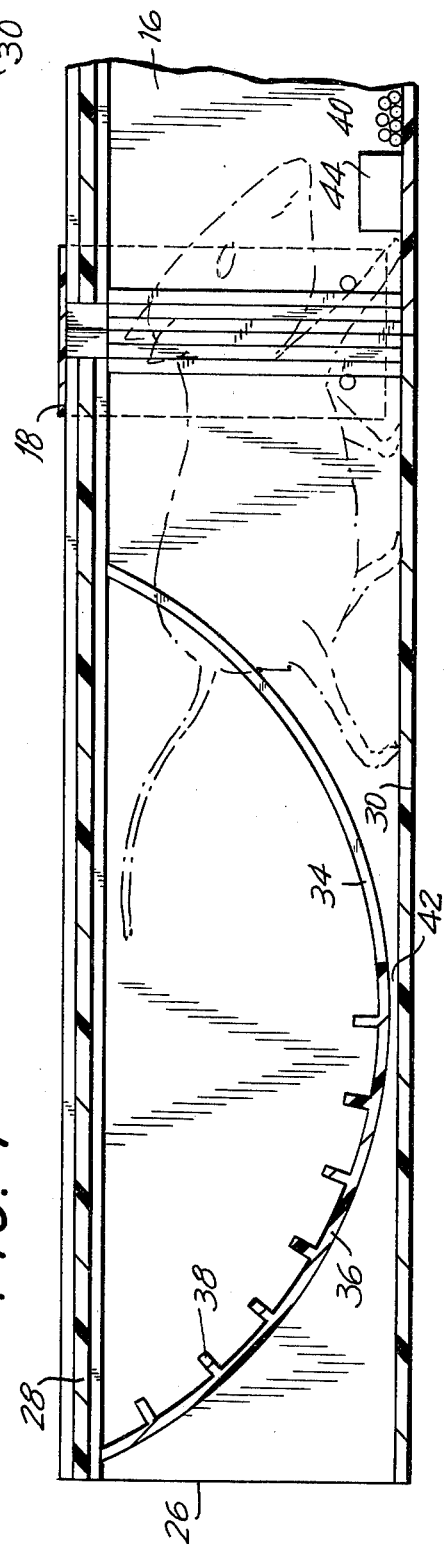

4,031,653

BAITING ARRANGEMENT FOR RODENTS

BACKGROUND OF THE INVENTION

The present application is a Continuation-in-Part of the parent application Ser. No. 466,149, filed May 2, 1974, and now U.S. Pat. No. 3,965,609.

In the control of rodents in residential buildings, restaurants and industrial plants, for example, it is desirable to distribute poisonous bait at locations where rodents are suspected to pass. In the past, such distribution of bait was made in substantially open trays which contained the poison intended for the rodents. The trays were open and the poison was freely exposed so that children and domestic animals were often poisoned as a result of reaching into the corners or locations where such trays were placed with the intention that only rodents have access thereto.

The poisonous bait within the open trays furthermore, would also often be spilled and carried from the trays as a result of the actions of cleaning personnel which were not aware of the presence of the poisonous bait. Thus, during cleaning of the floors containing the poisonous bait, for example, a broom or vacuum cleaner would often strike a tray and thereby cause the spillage of the poisonous bait from the tray, and the subsequent dispersion of the bait over a wide area.

Accordingly, it is an object of the present invention to provide an arrangement for containing poisonous bait for rodents within an enclosure so as not to be accessible to children and domestic animals.

Another object of the present invention is to provide a bait arrangement for rodents of the foregoing character, in which rodents may freely enter without sensing the effects of the enclosure containing the poisonous bait.

A further object of the present invention is to provide a bait arrangement for rodents which is constructed of modular units that may be assembled for adapting the arrangement to placement along a wall or a corner of a room or space.

A still further object of the present invention is to provide a bait feeding arrangement for rodents, as described, which may be simply assembled from modular units without the application of special tools.

It is a particular feature of the present invention to provide a bait feeding arrangement for rodents which may be readily inspected while being inaccessible, at the same time, to children and domestic animals.

SUMMARY OF THE INVENTION

The objects of the present invention are achieved by providing a plurality of modular units of plastic construction which may be assembled readily to conform to a corner of a room or space where the baiting arrangement is to be placed. When assembled, the modular unit provides an entrance for the rodent which permits the rodent to have free access to the baiting arrangement. At the same time, the entrance to the baiting arrangement prevents children or domestic animals from entering or having access to the poisons located therein. After entering the arrangement, in accordance with the present invention, and feeding from the poisons therein, the rodent exits through the location from which it entered.

After entering the arrangement provided in accordance with the present invention, the rodent has free, unobstructed passage areas so that the rodent will not be tempted to bypass the baiting station. The rodent enters the arrangement by stepping and walking on a curved plastic member having steps on the walking surface. The curved member is movable within a mating groove on each of the side walls of the modular unit serving as the entrance and exit unit. As the rodent progressively walks on the curved member, that curved member moves in a direction which projects the rodent into the interior of the modular unit. Connected to the entrance and exit unit, is a feeding and baiting unit to which the rodent has free access immediately upon leaving the stepped and curved member. After feeding from the poisons in the connecting baiting unit, the rodent is required to leave the arrangement by exiting through the same passage or location from which it has entered. By thus reversing himself, the rodent passes over the area containing the poisons, a second time, and thus gives greater assurance that the rodent has fed from the baiting unit.

The unit containing the poisons is in the form of an elongated housing and connects to an entrance and exit unit on each end thereof.

The walls of the modules may be opaque and darkened plastic, whereas the tops or roofs of the modules may be of transparent plastic plates to enable inspection of the interior of the module.

The novel features which are considered as characteristic for the invention are set forth in particular in the appended claims. The invention itself, however, both as to its construction and method of operation, together with additional objects and advantages thereof, will be best understood from the following description of specific embodiments when read in connection with the accompanying drawings.

BRIEF DESCRIPTION OF THE DRAWING

FIG. 1 is a perspective view and shows an assembly of modules conforming to placement in a room, for example, for feeding rodents with bait therein, in accordance with the present invention;

FIG. 2 is a sectional view taken along line 2—2 in FIG. 1;

FIG. 3 is a sectional view taken along line 3—3 in FIG. 2;

FIG. 4 is a sectional view and shows the construction of the entrance/exit unit after a rodent has entered the baiting arrangement;

FIG. 5 is a partial sectional view of the assembly of FIG. 1 and shows the construction for trapping a rodent alive within the arrangement of the present invention.

DESCRIPTION OF THE PREFERRED EMBODIMENTS

Referring to the drawing, and in particular to FIG. 1, a modular assembly 10 is comprised of a first entrance and exit unit 12, a second entrance and exit unit 14, and a central interconnecting unit 16 which contains the feed and water for the rodent. Interconnecting straps 18 and 20 serve to bolt together the units 12, 14 and 16 by means of screws 22, for example. The bases of the units 12, 14 and 16 are formed with substantially dove-tail joints 24 which permit the units to interleaf so as to provide for a smooth transition and passage between the units. The side walls 26 of the unit may be made of dark opaque plastic material to prevent distraction of the rodent while entering and being present within the interior of the baiting arrangement. At the same time, the side walls may also be left transparent for inviting different species of rodents or similar animals to enter. The roof-top plate 28 which slides in grooves at the top of the side walls 26, is made of transparent plastic material to allow for inspection of the interior of the baiting arrangement. With the sliding arrangement of the roof-top plate 28, furthermore, it is possible to remove these top plates 28 and to service the interior of the baiting arrangement with feed and water, and to clean the interior of the units. Such removal of the top plate 28 may be accomplished substantially without disassembling the modular units.

Whereas the bottom plate 30, side walls 26, and roof-top plate 28 may be assembled in the form of separate elements, the units 12, 14 and 16 may also be fabricated so that the side walls, bottom plate and grooves for the roof-top plate are of integral construction.

Along a portion of the side walls 26 of the entrance and exit units 12 and 14, are panels 32, into which are cut curved grooves 34. These curved grooves 34 may be in the form of segments of an ellipse or circle, for example. Within these grooves 34, rides slidingly a member 36 which serves as a gate through which the rodent enters and exits the baiting arrangement. This gate member 36 is in the form of a plastic element curved to conform to the grooves 34. The top surface of the member 36 on which the rodent is required to step for entering the baiting arrangement, has steps 38 integrally formed with the member 36.

When the rodent is on the outside of the baiting arrangement, and desires gain access to the bait or feed 40 distributed on the base of the central unit 16, for example, the rodent proceeds to walk onto the gate member 36, as shown in FIG. 2. The gate members 36 in both units 12 and 14 are in the position shown in FIG. 2, prior to the time that the rodent proceeds to enter the baiting arrangement. Once the rodent has stepped onto the gate 36 in the unit 12, for example, the gate member 36 becomes displaced and moves within the groove 34 from the right-hand portion of the groove in FIG. 2, to the left-hand portion as shown in FIG. 4. The gate member 36 is caused to move along the groove 34, in this manner, as a result of the weight of the rodent. After the rodent has walked along the gate member 36 starting from the beginning shown in FIG. 2, and has reached the other end of the gate member, the latter is in the position shown in FIG. 4, at which point, the rodent is free to enter the central feeding unit 16.

After feeding from the bait 40 in the unit 16, the rodent will tend to proceed in the longitudinal direction of the unit 16, and reach the unit 14. However, the gate member 36 within the unit 14 will be in the position as shown in FIG. 2, and the rodent will thereby be prevented from exiting through this unit 14. As a result, the rodent will be required to turn around and pass once more through the unit 16 in order to reach the unit 12 from which it has entered.

In passing through the unit 16 a second time, a substantial insurance is had that the rodent will feed from the bait 40 before reaching the unit 12. Since the position of the gate member 36 in the unit 12 is as shown in FIG. 4, when the rodent is within the interior of the baiting arrangement, the rodent is free to step onto the member 36 and in progressively walking thereon, the gate member 36 will move from the left-hand portion shown in FIG. 4, to return to the right-hand portion of the groove 34 shown in FIG. 2. In thus riding along the groove 34, from the left-hand portion in FIG. 4 to the right-hand portion, as shown in FIG. 2, the rodent finds itself able to leave the unit 12 and proceed away from the baiting arrangement.

Thus, the gate member 36 serves as a curve member which occupies only a portion of the length of the groove 34, and serves as a means whereby the rodent can gain access to the interior of the baiting arrangement, and once located within the interior thereof, the rodent is required to exit through the same unit or gate member from which it entered. Consequently, if the rodent were to have entered the interior of the baiting arrangement from the unit 14, it would not be able to leave through the unit 12, but would be required to turn around and exit by traversing again the member 36 within the unit 14. As a result of such turn around required of the rodent to leave the baiting arrangement, the rodent is subject twice to the bait or feed 40.

The curved construction of the gate members 36 in conjunction with the sliding grooves 34, provides the feature that the baiting arrangement, in accordance with the present invention, is tamper proof. Children are unable to gain access to the interior of the arrangement by moving a hand therein, since the gate member 36 will serve as an obstruction for that purpose, while allowing free passage to a rodent. At the same time, by selecting the dimensions and cross-section of the units appropriately, domestic animals are also prevented from entering the units.

A space 42 left between the groove 34 and the base plate member 30, provide a passage through which the rodent may smell or receive odors from the bait within the central unit 16.

The feed and water for the rodent within the unit 16, may be distributed directly onto the base plate 30, or in receptacles placed on this base plate.

The poisonous material which may be placed within the receptacles 42 as bait for the rodents may be in the form of DDT, warfarin or the compounds commonly known as chlorophacinone or liphadione. Water may also be contained within one of the receptacles 44 placed in the feed station 16.

For purposes of trapping a rodent or similar animal alive within the baiting arrangement, the feed within the unit 16 is made non-poisonous. At the same time, springs 46 shown in FIG. 5 connect between a connecting member 48 on the gate 36, and a similar connecting member 50 on the panel 32 in the proximity of groove 34. The tension in the spring 46 is sufficiently light, so that the rodent may walk freely onto the gate 36 which then moves under the weight of the rodent, in accordance with the specific manner described above. After the rodent has, however, entered the interior of the unit 12, for example, as shown in FIG. 5, the springs 46 serve to snap the gate member 36 back to its initial position, in which it was prior to the entry of the rodent. Thus, the gate member 36 is returned by the springs 46 from the left-hand portion of the groove 34 shown in FIG. 5, to the right-hand portion as shown in FIG. 2 after the rodent has entered the interior of the unit 12. As a result of having been returned to the right-hand portion of the groove by the springs 46, the gate member 36 prevents the rodent from leaving the interior of the unit. When desiring to trap the rodent or similar animals alive, the unit 14 is also provided with such springs 46 in similar construction as the unit 12, to enable the animal to enter the baiting arrangement from either end. At the same time, however, the springs 46, in returning the gate members 36 to their initial positions, prevent the animal from leaving the baiting arrangement, once it has entered.

The walls and bottom or base members of the units of the present invention, may be made of dark plastic material such as bakelite or vulcanized plexiglass, for example.

Without further analysis, the foregoing will so fully reveal the gist of the present invention that others can, by applying current knowledge, readily adapt it for various applications without omitting features that, from the standpoint of prior art, fairy constitute essential characteristics of the generic or specific aspects of this invention, and therefore, such adaptations should and are intended to be comprehended within the meaning and range of equivalence of the following claims.

I claim:

1. A bait feeding arrangement for rodents comprising, in combination, a modular entrance and exit housing with an opening through which a rodent may enter and leave; said housing having side walls with curved grooves formed therein; a curved closure member slidable within said grooves in said side walls; and a modular feeding housing connected to said entrance and exit housing and containing feed for said rodent, said curved closure member being in a first position closing said opening prior to entry into said entrance and exit housing by said rodent, said rodent entering said entrance and exit housing by moving on said curved closure member, said curved closure member sliding in said grooves toward a second position closing said opening when said rodent moves on said curved closure member, said rodent having a free passage into said entrance and exit housing after leaving said curved closure member in said second position, said rodent moving on said curved closure member to leave said entrance and exit housing, said curved closure member sliding in said grooves from said second position to said first position when said rodent leaves the interior of said entrance and exit housing.

2. The feeding arrangement as defined in claim 1, wherein said grooves comprise portions of an ellipse.

3. The feeding arrangement as defined in claim 1, wherein said grooves comprise portions of a circle.

4. The feeding arrangement as defined in claim 1, including steps on said curved closure member, said steps being walked on by said rodent in moving over said curved closure member.

5. The feeding arrangement as defined in claim 1, including an identical auxiliary entrance and exit housing connected to an opposite end of said modular feeding housing, said modular feeding housing comprising an elongated housing having two open ends, said first-mentioned entrance and exit housing being connected to one end of said feeding housing and said auxiliary entrance and exit housing being connected to the opposite end of said feeding housing.

6. The feeding arrangement as defined in claim 1, wherein said side walls are of opaque material.

7. The feeding arrangement as defined in claim 1, including a roof panel member of transparent material.

8. The feeding arrangement as defined in claim 1, including connecting strap means for connecting said entrance and exit housing to said feeding housing, said connecting strap means being U-shaped and covering substantially the joint of said housings.

9. The feeding arrangement as defined in claim 1, including dove-tail-joint means on said entrance and exit housing and said feeding housing for interconnecting said housings.

10. A bait feeding arrangement for rodents comprising, in combination, a modular entrance housing with an opening through which a rodent may enter; said housing having side walls with curved grooves formed therein; a curved closure member slidable within said grooves in said side walls; a modular feeding housing connected to said entrance housing and containing feed for said rodent, said curved closure member being in a first position closing said opening prior to entry into said entrance housing by said rodent, said rodent entering said entrance housing by moving on said curved closure member, said curved closure member sliding in said grooves toward a second position closing said opening when said rodent moves on said curved closure member, said rodent having a free passage into said entrance housing after leaving said curved closure member in said second position; spring means connected to said curved closure member and said entrance housing for returning said curved closure member from said second position to said first position after said rodent has entered the interior of said entrance housing for trapping said rodent therein.

* * * * *